United States Patent
Phelan et al.

(10) Patent No.: US 9,524,183 B1
(45) Date of Patent: Dec. 20, 2016

(54) EMPLOYING APPLICATION CONTAINERS IN A LARGE SCALE PROCESSING ENVIRONMENT

(71) Applicant: Bluedata Software, Inc., Mountain View, CA (US)

(72) Inventors: Thomas Phelan, San Francisco, CA (US); Joel Baxter, San Carlos, CA (US); Michael J. Moretti, Saratoga, CA (US); Gunaseelan Lakshminarayanan, Cupertino, CA (US); Swami Viswanathan, Morgan Hill, CA (US)

(73) Assignee: Bluedata Software, Inc., Mountain View, CA (US)

( * ) Notice: Subject to any disclaimer, the term of this patent is extended or adjusted under 35 U.S.C. 154(b) by 0 days.

(21) Appl. No.: 14/805,758

(22) Filed: Jul. 22, 2015

(51) Int. Cl.
G06F 3/00 (2006.01)
G06F 9/455 (2006.01)
G06F 9/54 (2006.01)

(52) U.S. Cl.
CPC ............ *G06F 9/45558* (2013.01); *G06F 9/54* (2013.01); *G06F 2009/4557* (2013.01); *G06F 2009/45583* (2013.01)

(58) Field of Classification Search
CPC ............................. G06F 9/54; G06F 2009/455
USPC ............................................... 719/310; 718/1
See application file for complete search history.

(56) References Cited

U.S. PATENT DOCUMENTS

| | | | | |
|---|---|---|---|---|
| 2011/0208928 A1* | 8/2011 | Chandra | ............. | G06F 11/1466 711/162 |
| 2012/0290630 A1* | 11/2012 | Aizman | ............. | G06F 17/30233 707/827 |
| 2013/0152047 A1* | 6/2013 | Moorthi | ................. | G06F 11/368 717/124 |
| 2013/0167147 A1* | 6/2013 | Corrie | ................. | G06F 9/45533 718/1 |
| 2014/0281376 A1* | 9/2014 | Yamada | ................ | G06F 9/3885 712/28 |
| 2015/0081979 A1* | 3/2015 | Banta | .................. | G06F 12/0804 711/135 |
| 2015/0248554 A1* | 9/2015 | Dumitru | ................ | G06F 21/53 726/1 |
| 2015/0277791 A1* | 10/2015 | Li | ......................... | G06F 3/0619 711/114 |
| 2015/0281111 A1* | 10/2015 | Carl | ........................ | H04L 47/70 709/226 |
| 2016/0092252 A1* | 3/2016 | Wagner | ............... | G06F 9/45533 718/1 |
| 2016/0098285 A1* | 4/2016 | Davis | .................. | G06F 9/45545 718/1 |

OTHER PUBLICATIONS

Yingyi Bu, THe Haloop approach to large-scale interative analysis, 2012.*

* cited by examiner

*Primary Examiner* — Lechi Truong

(57) ABSTRACT

Systems, methods, and software described herein provide for enhancements to large scale data processing architectures. In one implementation, a service architecture for large scale data processing includes a host computing system, and a virtual machine executing on the host computing system. The service architecture further includes a plurality of application containers executing on the virtual machine, wherein each of the application containers comprises a large scale processing node running one or more java virtual machines.

15 Claims, 5 Drawing Sheets

EMPLOYING APPLICATION CONTAINERS IN A LARGE SCALE PROCESSING ENVIRONMENT

TECHNICAL FIELD

Aspects of the disclosure are related to computing hardware and software technology, and in particular to providing a service architecture for large scale data processing.

TECHNICAL BACKGROUND

An increasing number of data-intensive distributed applications are being developed to serve various needs, such as processing large data sets that generally cannot be handled by a single computer. Instead, clusters of computers are employed to distribute various tasks or jobs, such as organizing and accessing the data and performing related operations with respect to the data. Various applications and frameworks have been developed to interact with such large data sets, including Hive, HBase, Hadoop, Amazon S3, and CloudStore, among others.

At the same time, virtualization techniques have gained popularity and are now commonplace in data centers and other environments in which it is useful to increase the efficiency with which computing resources are used. In some virtualized environments, one or more virtual machines are instantiated on an underlying computer (or another virtual machine) and share the resources of the underlying computer. These virtual machines include an operating system and one or more applications and processes to provide a particular operation, such as large scale data processing. However, although virtual machines may more efficiently share the resources of the underlying computer, virtual machines often require extensive overhead and memory that could otherwise be provided to the desired applications and processes executing thereon.

OVERVIEW

Provided herein are enhancements in providing resources for large scale processing clusters. In one example, a service architecture includes a host computing system configured to execute a full operating system virtual machine. The service architecture further includes application containers executing on the virtual machine, wherein the application containers comprise large scale processing framework nodes running one or more java virtual machines.

In some implementations, the application containers may be configured as Hadoop nodes that execute instances of MapReduce or YARN, wherein the instances of MapReduce or YARN are responsible for spawning the java virtual machines.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
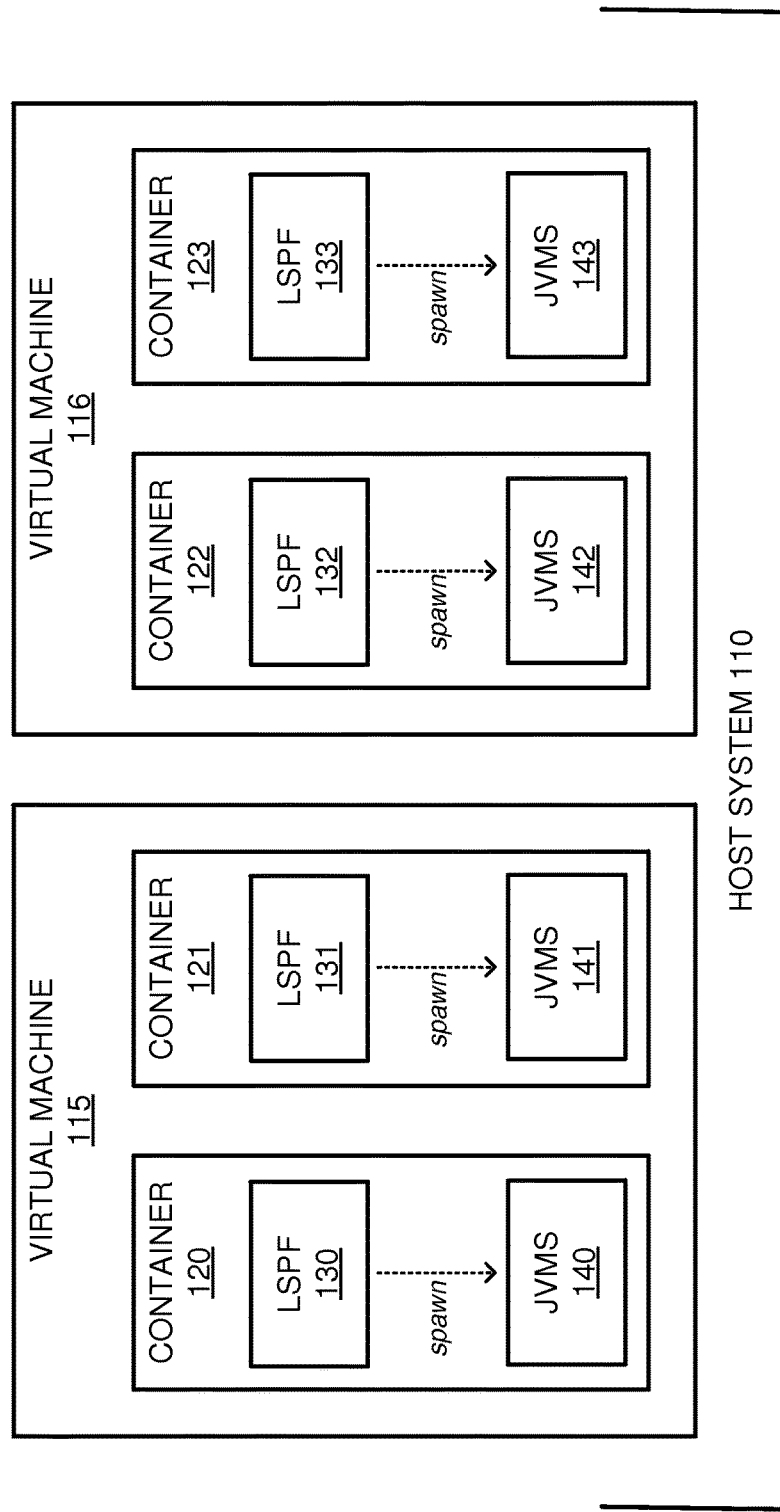
FIG. 1 illustrates a service architecture for providing large scale data processing according to one implementation.

Various examples described herein provide for a service architecture for large scale data processing. In particular, application containers, such as Docker containers, Linux containers, jails, or other similar application containers provide virtualization advantages over standard virtual machines. Virtual machines emulate a particular computing system, and include individual operating systems and processes to provide a particular operation. In contrast, application containers, when executed on a host, share resources provided by the host. These resources include the operating system kernel from the host, and may further include repositories and other approved resources that can be shared with the individual containers from the host. However, although resources may be shared between the containers, the containers are provisioned to have a private access to the operating system with their own identifier space, file system structure, and network interfaces. Accordingly, although multiple containers may be operating on a host system at any one time, the containers may be treated as individual computing systems or nodes.

In the present example, the application containers are configured to provide a large scale processing framework (LSPF), such as Hadoop, Spark, or some other LSPF. These frameworks allow parallel data processing across a plurality of nodes to more efficiently and quickly provide responses to data queries of large data sets. Here, each of the containers is configured as an LSPF node with MapReduce functionality on top of a host virtual machine. Accordingly, rather than providing an individual operating system to each of the LSPF nodes of the environment, application containers may be used, allowing the individual nodes to share an operating system and other dependent resources from host virtual machines.

In some implementations, in addition to the host virtual machine and the associated application containers that provide the LSPF, a cache service may be provided to supply data to the application containers. This cache service may be used to identify data requests for the individual LSPF nodes and provide the required data as requested to the containers. To retrieve the data, the LSPF nodes may use a data call in a first data retrieval format that requires translation into a second data retrieval format before the data can be obtained for the LSPF node. For example, a Hadoop node executing as a container on the host virtual machine may require access to a GlusterFS repository. As a result, the cache service may identify the request using Hadoop Distributed File System (HDFS) format, and translate the request to the GlusterFS format to retrieve the necessary data. Once the data is retrieved, the Hadoop node may access the required data for processing.

In addition to retrieving the data for the LSPF nodes, in some implementations, the cache service may further be configured with shared memory to share data between the physical host computing system and the application containers executing on the hosting virtual machine. For example, once data is retrieved from a storage repository using the cache service, the cache service may store the data to locations in memory that are also accessible by the requesting LSPF node. Once cached in memory, the LSPF process may retrieve the data from the locations in memory for processing. By sharing memory locations between the cache service process on the host computing system and the virtual application containers, efficiency may be increased in limiting the number of writes to memory for each data read and write. Consequently, data may not be required to be read into a first part of memory associated with the host computing system, then duplicated into a second part of memory associated with the virtual containers.

To further demonstrate the large scale processing architecture, FIG. 1 is provided. FIG. 1 illustrates a service architecture 100 for providing large scale data processing according to one implementation. Service architecture 100 includes host system 110, virtual machines 115-116, and application containers 120-123. Application containers are configured with LSPF instances 130-133, which spawn corresponding java virtual machines (JVMs) 140-143 based on allocated job process requirements. In some implementations, LSPF instances 130-133 represent Hadoop framework instances with YARN to manage the MapReduce operations occurring on the individual application container.

In operation, an administrator initiates one or more host computing systems, such as host system 110, to provide a platform for the virtual LSPF nodes. LSPF nodes provide parallel data processing in frameworks, such as Hadoop, Spark, or some other LSPF framework. By virtualizing the LSPF nodes, the physical processing resources, such as the processing clock cycles, processing cores, memory, and other similar resources may be more efficiently used from the host machine. Here, application containers 120-123 are initiated on virtual machines 115-116. Virtual machines 115-116 execute via a hypervisor, not shown, on host system 110, which abstracts the physical components of host system 110, and provides the abstracted components to the virtual processing systems. This abstraction provides each virtual machine of virtual machines 115-116 with a particular amount of memory, processing cores, storage space, and other abstracted components of the host system.

Within virtual machines 115-116, application containers 120-123 are initiated that comprise isolated processes that share resources from the host machine, or in this case virtual machines 115-116. In particular, application containers 120-123 may share kernel resources of virtual machines 115-116, while maintaining namespace isolation and resource allocation for the individual processes in the application containers. Accordingly, rather than requiring a full operating system for each of the processing nodes within a large scale processing environment, application containers may be used to share resources provided by a single operating system to limit the amount of overhead required for each of the processing nodes.

Referring still to the example of FIG. 1, virtual machine 115 may execute an operating system with a kernel capable of supporting application containers. Once application containers 120-121 are initiated on virtual machine 115, namespace and allocation resources may be created for each of the containers, allowing the containers to operate independently of one another on host virtual machine 115. Similar operations may also occur with virtual machine 116 to provide resources to containers 122-123.

Once application containers 120-123 are initiated, and provided with a large scale processing framework, such as a Hadoop framework, Spark framework, or some other similar framework, job processes may be allocated to the application containers creating a processing cluster from the application containers. For example, a job process may be allocated to application containers 120-123 to process an HDFS data repository. Once the job process is allocated to the application containers, the large scale processing functions 130-133, such as MapReduce or YARN functions, within the containers may spawn JVMs 140-143 to process the data for an assigned job process. JVMs 140-143 comprise processes that execute Java bytecode to perform particular data actions. These data actions may include retrieving required data from a database, analyzing the data from the database, reducing the results of the analysis from the database, or any other similar operation on the data. Although not illustrated in the present example, it should be understood that a cache service might be included on host system 110 to assist in the retrieval and processing of the data from the required storage repositories.

Figure 2:
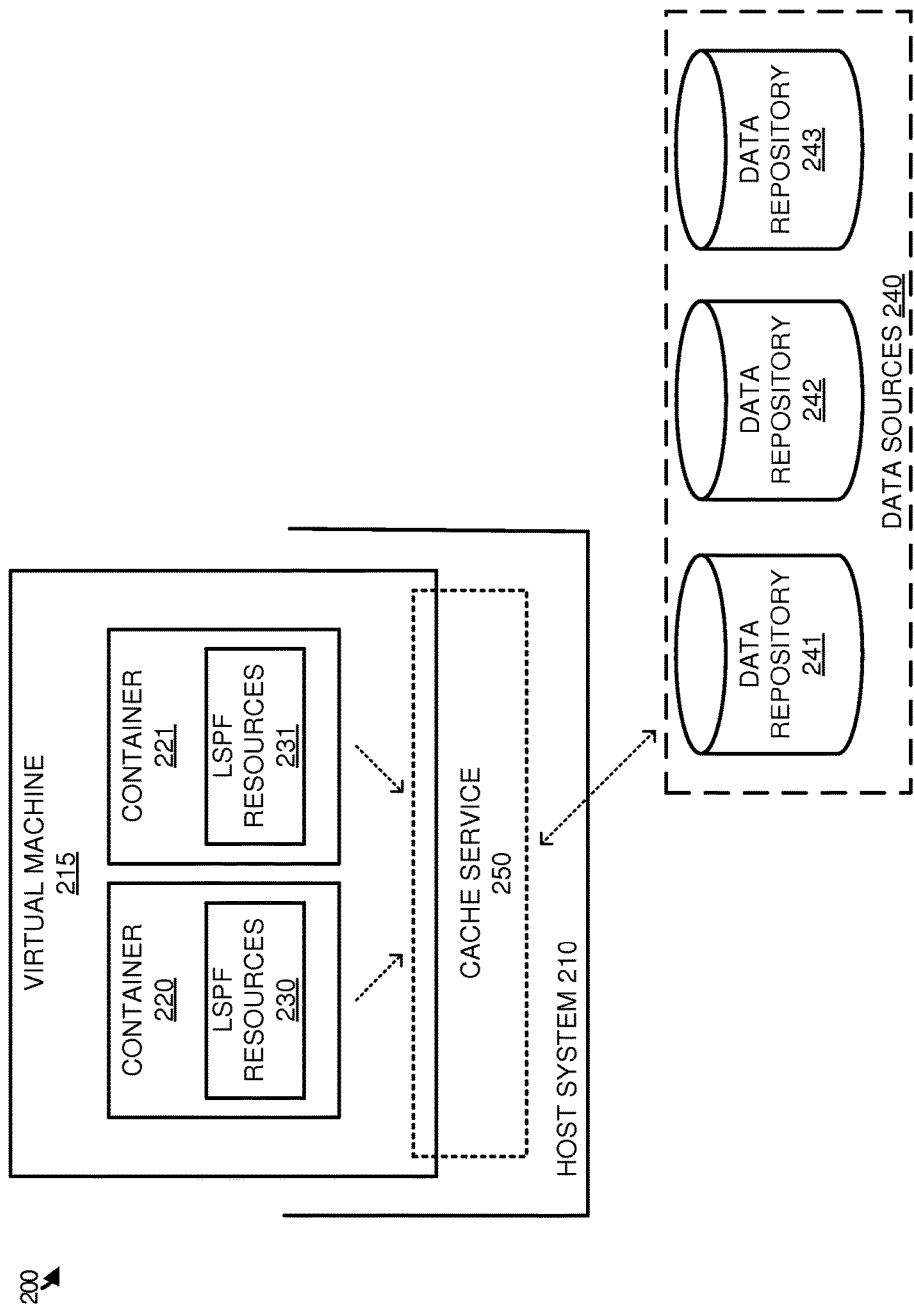
FIG. 2 illustrates a computing environment for providing large scale data processing according to one implementation.

To further illustrate the data processing operations within a LSPF cluster, FIG. 2 is provided. FIG. 2 illustrates a computing environment 200 for providing large scale data processing according to one implementation. Computing environment 200 includes host system 210, virtual machine 215, application containers 220-221, and cache service 250. Computing environment 200 further includes data sources 240, which further comprise data repositories 241-243. Data repositories 241-243 may be stored using Hadoop distributed file system (HDFS), versions of the Google file system, versions of the Gluster file system (GlusterFS), or any other distributed file system version—including combinations thereof.

As described in FIG. 1, virtual machines and containers may be initiated on a host system to more efficiently use the processing resources available on the host system. In particular, by abstracting the physical components of host system 210, a plurality of large scale processing nodes may be executed on a single computer, allowing the single computer to provide the same processing capability as a plurality of physical machines. As depicted in FIG. 2, cache service 250 is included in host system 210 to provide an interface or intermediary between application containers 220-221 and data repositories 241-243. Cache service 250 is configured to identify a data request from each of application containers 220-221, and retrieve the required data from data sources 240. Further, in some instances, cache service 250 may be used to identify write requests from each of application containers 220-221, and write the required data to the appropriate data repository.

In some implementations, cache service 250 may be configured to act as a translator to provide the required data to each of the requesting application containers. For example, application container 220 and LSPF resources 230 may request data using a first data retrieval format. In response to the request, cache service 250 may identify and translate the request into a second data retrieval format, and retrieve the data from the required repository in data sources 240. Once retrieved, cache service 250 may provide the data in a manner expected by application container 220 and LSPF resources 230. Accordingly, application container 220 may use any data retrieval format, including HDFS, GlusterFS, or some other data retrieval requesting format even if the necessary data is stored in a different file system or data object storage format.

As illustrated in FIG. 2, cache service 250 is illustrated as overlapping between virtual machine 215 and host system 210. In some implementations, cache service 250 may comprise shared memory that can be accessed by at least one process on the host system, and at least one process or container within the virtual machine. Accordingly, when cache service 250 retrieves data, cache service 250 may cache the data in a storage location that is shared between the host system 210 and the virtual machine 215. Once cached, application containers 220-221, which share resources with virtual machine 215, may access the data and process the data as required. By caching the data within a shared memory location, the data does not need to be cached in the host system 210, and subsequently transferred into a location delegated to virtual machine 215.

Although illustrated separately in the present example, it should be understood that one or more repositories in data sources 240 might be stored on host system 210. However, in other implementations data sources 240 may be stored on one or more computing systems or devices that are accessible via internet protocol (IP), fiber channel, or some other addressable communication format. Because the data repositories may be stored on one or more devices, cache service 250 may be configured with connectors to identify locations and credentials to access the various data required by LSPF resources 230-231 and application containers 220-221. These connectors allow cache service 250 to identify resources required for each request, and access the data using the requisite format to provide the data to the LSPF node.

Figure 3:
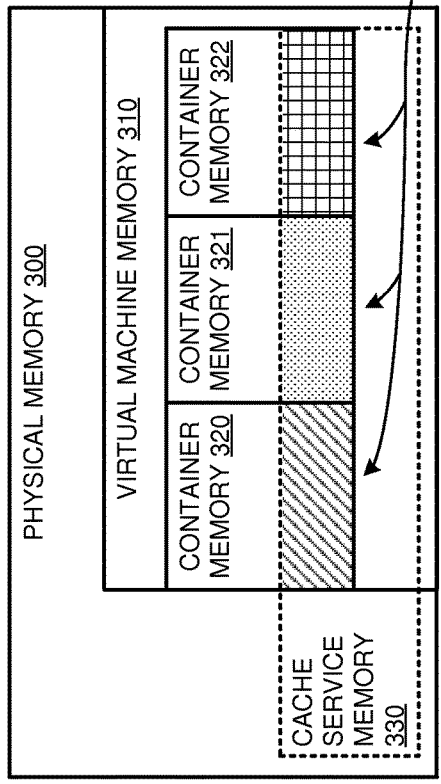
FIG. 3 illustrates a physical memory structure for a host computing system according to one implementation.

Turning to FIG. 3, FIG. 3 illustrates a physical memory structure for a host computing system according to one implementation. FIG. 3 includes physical memory 300 representative of physical memory of a host computing system, virtual machine memory 310 representative of memory for a virtual machine executing on the host computing system, container memory 320-322 representative of memory for application containers executing within the virtual machine, and cache service memory 330 representative of memory for a cache service used to retrieve data for LSPF functions executing within the application containers. Physical memory 330 further includes shared memory 335 that is shared between at least one process executing on the physical host, the virtual machines, and the application containers.

As described herein, full operating system virtual machines and application containers are executed on a host computing system to more efficiently use the processing resources of the host computing system. In particular, a virtual machine abstracts the physical components of the machine and provides a virtual computing system as a process on the physical host. Here, in addition to the virtual machine, application containers are also provisioned that execute on the virtual machine. Application containers share resources, such as the kernel of the operating system from the virtual machine, but are provided their own identifier space and network address, allowing the container to be segregated from other containers and processes operating on the same virtual machine. Accordingly, although the containers represented in physical memory 300 by container memory 320-322 share the same operating system and one or more resources from the virtual machine, the containers may operate independently of one another on the virtual machine. Further, by sharing overhead resources, such as the operating system, a greater number of containers may be provisioned on a single computing system, allowing for an increase in efficiency for the data processing.

To provide the data to each of the application containers that run the LSPF cluster services, a cache service is provided that acts as an intermediary between the LSPF processes and the requisite data. As illustrated in FIG. 3, each of the containers represented by container memory 320-322 is allocated a portion of shared memory 335 that is used to temporarily store data for processing within the containers. For example, when the container represented by container memory 320 requests data, the cache service may place a data object within the shared memory portion for that container, allowing the container to access the requisite data.

Here, shared memory 335 is accessible by the cache service that may execute wholly or partially on the physical host and the virtual machine. The cache service identifies requests from the LSPF instances operating in the application containers, retrieves the data using the requisite data retrieval command, and places the data within a corresponding portion of shared memory 335 for the container. For example, a container operating with an instance of YARN running one or more JVMs may request data using a first data retrieval format, such as HDFS data retrieval format, or some other data retrieval format. In response to the request, the cache service may translate the request, if necessary, into an alternative data retrieval format, such as a format necessary for GlusterFS, or some other data retrieval format. Once retrieved, the cache service may place the data in a cache location associated with the requesting application container. By implementing shared memory 335 in physical memory 300, the time to retrieve data for processing is improved, as the data is not first required to be cached on the host and then transferred into the virtual processing system.

Similarly, in some implementations, the application containers may be required to write data to the storage repositories. Accordingly, the data writes from the application containers may be temporarily stored in shared memory 335, and transferred, by the cache service, to the appropriate storage repository.

Figure 4:
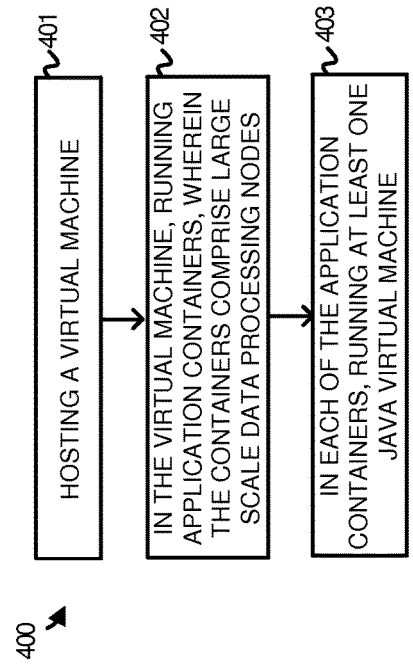
FIG. 4 illustrates a method of providing large scale data processing according to one implementation.

Turning to FIG. 4, FIG. 4 illustrates a method of providing large scale data processing according to one implementation. The operations of FIG. 4 are referenced parenthetically in the description below.

As described herein, to more efficiently use the computing resources provided by a host computing system, virtualization can be used to generate multiple processing nodes on a single computing system. To maintain the nodes, the method includes hosting a virtual machine on the host computing system (401). This virtual machine, provided by a hypervisor on the host computing system, includes abstracted hardware, such as processing cores, memory, data storage, and other similar hardware elements, and further includes an operating system capable of hosting application containers. The method further includes, in the virtual machine, running application containers, wherein the application containers comprise large scale data processing nodes (402). Within the large scale data processing nodes, the method provides for running at least one JVM, wherein the JVM is spawned as part of the large scale data processing framework (403). In some examples, the JVM may be spawned from YARN or a MapReduce function executing on the LSPF node, however, it should be understood that the JVMs may be spawned by any other similar LSPF function.

In many implementations, large scale data processing becomes more efficient by increasing the number of nodes and processing resources. To provide the requisite processing resources while limiting the amount of overhead, such as operating systems in virtual machines, application containers may be used that share the kernel and defined binaries of a single host, but are provided a separate identifier space and communication address. Accordingly, rather than maintaining a separate operating system for each of the processing nodes, the containers allow for a shared operating system on the virtual host computing system, limiting clock cycle and memory overhead that must be provided to the individual LSPFs.

In some implementations, to provide the large scale processing architecture described above, the method may further include executing a cache service on the host computing system. This cache service, which may reside in the virtual machine, in the application containers, as a separate process on the host, or any combination thereof is responsible for gathering the required data for each of the containers running in the virtual machine. In particular, the cache service is configured to identify a request for data from one of the application containers, retrieve the data from the appropriate storage repository, and cache the data in a location accessible to the application containers. In some examples, the application containers may be capable of processing data from multiple data repositories with data stored in a variety of different storage formats. These formats may include HDFS, GlusterFS, Blob storage format, or any other storage format. Similarly, although the application containers and LSPF nodes may execute using a first data requesting format, the format may not relate to the format required by the data repository. Accordingly, the cache service may be used to intercept data requests in the first format used by the LSPF node, translate the request into a format required by the data repository, and provide the data to the LSPF in the requesting format. By employing the cache service, LSPF nodes that would otherwise be unable to access data repositories may retrieve and process the necessary data.

Figure 5:
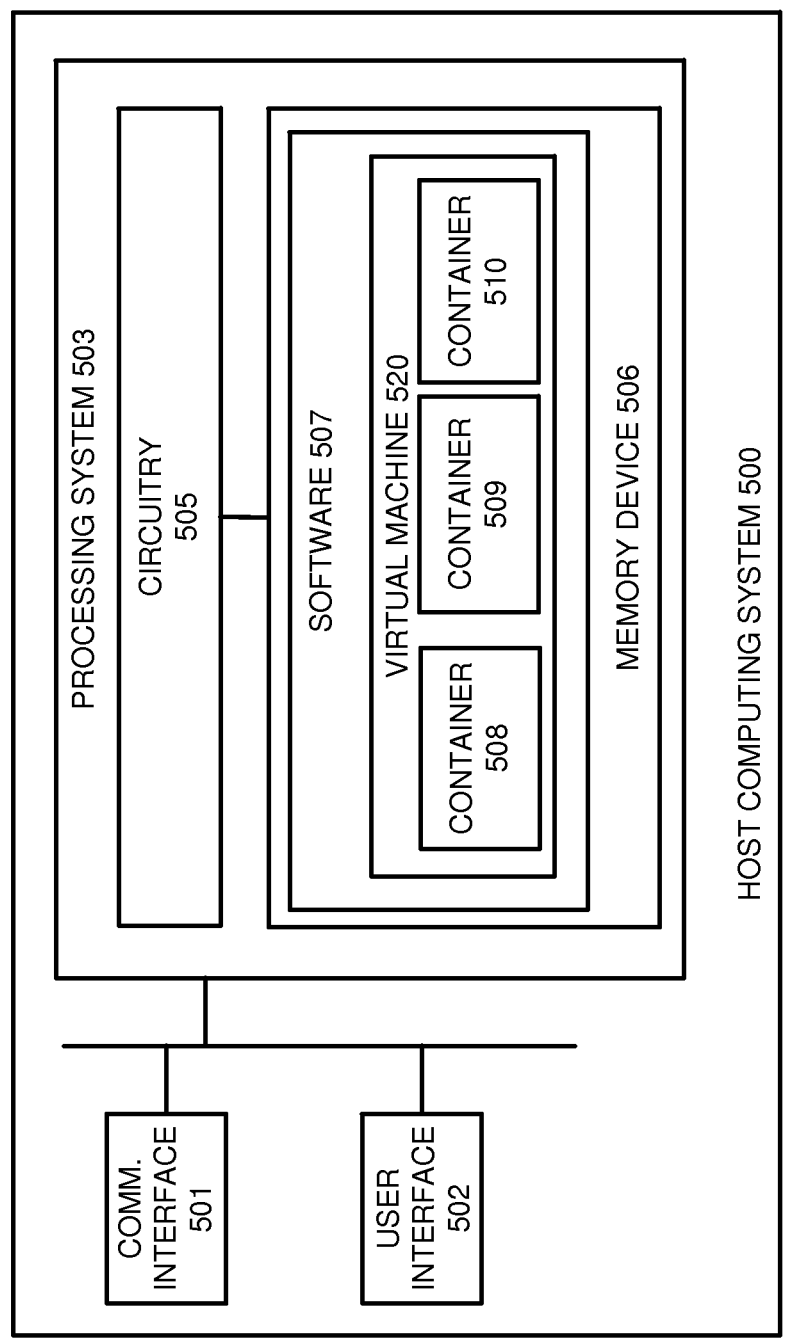
FIG. 5 illustrates a host computing system to provide large scale data processing according to one implementation.

FIG. 5 illustrates a host computing system 500 to provide large scale data processing according to one implementation. Host computing system 500 is representative of any host computing system in FIGS. 1-4, although other examples may exist. Host computing system 500 comprises communication interface 501, user interface 502, and processing system 503. Processing system 503 is linked to communication interface 501 and user interface 502. Processing system 503 includes processing circuitry 505 and memory device 506 that stores operating software 507. Host computing system 500 may include other well-known components such as a battery and enclosure that are not shown for clarity. Computing system 500 may be a personal computer, server, or some other computing apparatus—including combinations thereof.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use Time Division Multiplex (TDM), Internet Protocol (IP), Ethernet, optical networking, wireless protocols, communication signaling, or some other communication format—including combinations thereof. In some implementations, communication interface 501 may be configured to communicate with one or more other computing or storage systems responsible for storing the processing data. Communication interface 501 may further be configured to communicate with one or more administration systems that configure the various LSPF clusters for data processing.

User interface 502 comprises components that interact with a user to receive user inputs and to present media and/or information. User interface 502 may include a speaker, microphone, buttons, lights, display screen, touch screen, touch pad, scroll wheel, communication port, or some other user input/output apparatus—including combinations thereof. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Processing circuitry 505 is typically mounted on a circuit board that may also hold memory device 506 and portions of communication interface 501 and user interface 502. Operating software 507 comprises computer programs, firmware, or some other form of machine-readable processing instructions. Operating software 507 includes virtual machine 520 and application containers 508-510 used to execute large scale processing jobs. Although not illustrated, operating software 507 may further include an operating system, utilities, drivers, network interfaces, applications, or some other type of software. When executed by processing circuitry 505, operating software 507 directs processing system 503 to operate host computing system 500 as described herein.

In particular, processing system 503 is configured to host or provide a platform for virtual machine 520. To provide the platform, processing system 503 may execute a hypervisor that abstracts the physical components of host computing system 500, such as the processing cores, the memory, and other physical aspects of host computing system 500 and provides abstracted components to virtual machine 520. In addition to hosting virtual machine 520, virtual machine 520 is also configured to run or execute application containers 508-510, which correspond to LSPF nodes.

As described in FIGS. 1-4, large scale processing frameworks, such as Hadoop, Spark, or other similar frameworks require a plurality of processing nodes to more efficiently process large data sets. Here, rather than allocating a single node per host computing system, application containers are used to more efficiently use the processing resources of the physical machine. In particular, application containers 508-510 share kernel resources provided by an operating system 520, allowing application containers 508-510 to execute independently, while limiting the amount of overhead for each of the containers. Accordingly, rather than having an operating system for each of the LSPF nodes in the environment, a single operating system may be used across all of the containers, while maintaining separate identifier spacing and address for each of the containers.

Within each of the containers, MapReduce, YARN, or some other similar data processing instance is initiated to processes data from one or more storage repositories. These processing instances spawn JVMs to provide the required data processing functionality. To retrieve the data for the data processing instances and JVMs within the containers, in some implementations, a cache service may be deployed on computing system 500. This cache service identifies data requests made by the JVMs within the application containers and retrieves the data from the required storage repository. In some examples, the application containers may request data using a first data retrieval format, which requires translation into the data retrieval format necessary for the data repository. For example, although a container may execute an instance of YARN for Hadoop, the data required for processing may be stored in a BLOB object format. Consequently, the cache service may be used to identify the request in a first format from the container, translate the request into the necessary format for the BLOB object format, retrieve the data from the storage repository, and cache the data in a location accessible by the application container.

In some implementations, the cache service may be configured to provide data in shared memory that is accessible by the application containers executing on the virtual machine. This shared memory allows the cache service to retrieve data from the storage repositories and store the data in locations accessible by the virtual processing nodes. Accordingly, rather than requiring a copy of the data from the host into the virtual processing node, the data may be cached into memory locations accessible by the application containers and the cache service executing outside of the application containers.

Figure 6:
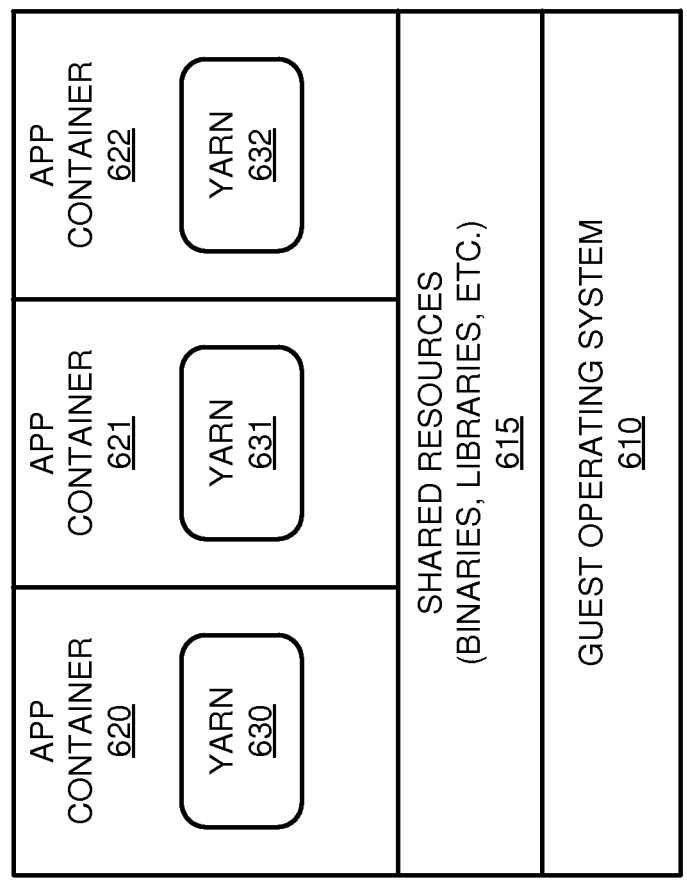
FIG. 6 illustrates an overview of sharing of resources between application containers according to one implementation.

Referring now to FIG. 6, FIG. 6 illustrates an overview 600 of sharing of resources between application containers according to one implementation. Overview 600 includes guest operating system 610 representative of an operating system for a virtual machine, shared resources 615, and application containers 620-622. Shared resources 615 may comprise binaries, libraries, and other similar resources that can be used to provide the desired operation of containers 620-622.

As illustrated, containers 620-622, which represent LSPF nodes, include YARN instances 630-632 that provide large scale data processing. To provide the data processing, application containers 620-622 share resources provided by guest operating system 610 and shared resources 615. Although the containers share resources, each of the containers may be provided with its own namespace and address, allowing the processes within the containers to execute separately from the other containers and processes executing on guest operating system 610.

In some implementations, shared resources 615 may include shared memory that is used to cache data for processing within the various application containers. To supply the data, a cache service, which may execute wholly or partially on guest operating system 610 and/or the host computing system, may be configured to retrieve data from various storage repositories within the environment. In particular, the cache service, which may be able to monitor the data requests of the containers, identifies a request for data, determines the appropriate storage volume for the request, and retrieves the data for the request. In some examples, the data repositories may be stored using a variety of different file system and data object formats including HDFS, GlusterFS, BLOB, or some other storage system. Accordingly, the LSPF and YARN processes executing within the application containers may be unable to retrieve the data directly. Instead, the cache service may identify a data request in a first data retrieval format, translate the request into a second data retrieval format the corresponds to the data repository, retrieve the data from the repository, and cache the data in shared memory for the requesting application container.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A service architecture for large scale data processing, the service architecture comprising:
    a physical host computing system;
    a virtual machine executing on the host computing system;
    a plurality of application containers executing on the virtual machine,
    wherein each of the application containers comprises a large scale processing node running one or more java virtual machines; and
    a cache service that acts as a data retrieval intermediary between the plurality of application containers and at least one data repository, and is configured to identify data requests from the plurality of application containers in a first retrieval format, translate the data requests to a second retrieval format, and retrieve the requested data from the at least one data repository via the second retrieval format.

2. The service architecture of claim 1 wherein each large scale processing node comprises a Hadoop processing node executing an instance of YARN.

3. The service architecture of claim 1 wherein the virtual machine executes an operating system, and wherein the plurality of application containers running on the virtual machine share kernel resources provided by the operating system.

4. The service architecture of claim 3 wherein the plurality of application containers running on the virtual machine share one or more binaries installed on the virtual machine.

5. The service architecture of claim 1 wherein the cache service runs in at least one of the host computing system or the virtual machine.

6. The service architecture of claim 5 further comprising shared memory accessible by the cache service and at least one process executing in each application container in the plurality of application containers, and wherein the cache service is configured to cache the requested data in the shared memory.

7. The service architecture of claim 1 wherein the one or more java virtual machines in each of the application containers are spawned in response to in response to a job assignment to the plurality of application containers.

8. An apparatus comprising:
    one or more non-transitory computer readable storage media; and
    processing instructions stored on the one or more non-transitory computer readable storage media to implement a service architecture for large scale data processing that, when read and executed by a processing system of a host computing system, direct the processing system to at least:
execute a virtual machine;
execute a plurality of application containers on the virtual machine, wherein each of the application containers comprises a large scale processing node running one or more java virtual machines; and
run a cache service that acts as a data retrieval intermediary between the plurality of application containers and at least one data repository, and is configured to identify data requests from the plurality of application containers in a first retrieval format, translate the data requests to a second retrieval format, and retrieve requested data from the at least one data repository via the second retrieval format.

9. A method of providing a service architecture on a host computing system for large scale data processing, the method comprising:
hosting a virtual machine on a host computing system;
in the virtual machine, running a plurality of application containers, wherein the plurality of application containers comprises large scale data processing nodes;
in each application container of the plurality of application containers, running at least one java virtual machine; and run a cache service that acts as a data retrieval intermediary between the plurality of application containers and at least one data repository, and is configured to identify data requests from the plurality of application containers in a first retrieval format, translate the data requests to a second retrieval format, and retrieve requested data from the at least one data repository via the second retrieval format.

10. The method of claim 9 wherein the large scale data processing nodes comprise Hadoop processing nodes executing instances of YARN.

11. The method of claim 9 wherein the virtual machine executes an operating system, and wherein the plurality of application containers running on the virtual machine share kernel resources provided by the operating system.

12. The method of claim 11 wherein the plurality of application containers running on the virtual machine share one or more binaries installed on the virtual machine.

13. The method of claim 9 wherein the cache service is further configured to cache the requested data in shared memory locations accessible by the cache service and at least one process executing in each application container in the plurality of application containers.

14. The method of claim 9 wherein the one or more java virtual machines in each of the plurality of application containers are spawned in response to a job assignment to the plurality of application containers.

15. The method of claim 9 wherein the application containers comprise Docker containers, Linux containers, or jails.

* * * * *